Jan. 13, 1925.

A. L. MILLER 1,522,738

METHOD OF SHAPING CANDY

Filed Dec. 8, 1923      2 Sheets-Sheet 1

INVENTOR
ALTON L. MILLER
BY
ATTORNEY

Jan. 13, 1925. 1,522,738
A. L. MILLER
METHOD OF SHAPING CANDY
Filed Dec. 8, 1923  2 Sheets-Sheet 2

INVENTOR
ALTON L. MILLER
BY
ATTORNEY

Patented Jan. 13, 1925.

1,522,738

UNITED STATES PATENT OFFICE.

ALTON L. MILLER, OF BROOKLINE, MASSACHUSETTS.

METHOD OF SHAPING CANDY.

Application filed December 8, 1923. Serial No. 679,429.

*To all whom it may concern:*

Be it known that I, ALTON L. MILLER, a citizen of the United States, and resident of Brookline, in the county of Norfolk and State of Massachusetts, have invented certain new and useful Improvements in Methods of Shaping Candy, of which the following is a specification.

This invention relates to the production of candy in the form of strips, and has particular reference to the manufacture of strips which are substantially rectangular in cross section to prepare them for conversion into relatively small lengths or blocks capable of being wrapped individually in a neat and attractive manner.

When round pieces or lumps of candy are individually wrapped, it is customary to enclose them in pieces of paper which are twisted at opposite sides of the lumps. Such wrapping is unsightly, and not secure, and requires large pieces of paper. And the large amount of space occupied by the twisted portions of the paper results in the necessity of employing larger containers for given quantities of candy than is required for candy enclosed in snugly fitting wrappers. As round pieces or lumps can not be wrapped snugly, there is a large demand for closely wrapped rectangular or block-shaped candies which can be closely packed in boxes or other containers with little or no extra space required because of the wrappers.

Heretofore, so far as I am aware, when block-shaped candies are to be manufactured, it has been customary to feed a flat mass or sheet of the material, while plastic, to the action of co-acting disk-shaped blades a number of which are carried by a pair of parallel shafts, said blades dividing the sheet into a series of narrow strips ready for transverse cutting to the sizes desired. One objection to this is that there is liability of the candy sticking to the blades; another is that there is waste at the edges of the sheet since the width of the latter can not be accurately controlled to accord with the length of the series of cutting blades, and another and important objection is that if the candy includes any filling material the knives cut through said filling which then shows at the edges of the strips. If the filling consists of nuts, many of the nuts are cut through and pieces of nuts are liable to then fall out prior to or during wrapping operations and so reduce the weight of the wrapped candy below that which is intended, and sometimes interfere with effective operation of the wrapping mechanism.

One of the objects of my invention is to provide strips of candy without waste, which strips are substantially rectangular in cross section and have smooth sides regardless of whether nuts or other fillling is included, whereby said strips, when transversely cut, can be enclosed in closely fitting wrappers by any well-known or suitable wrapping machines. This object is attained by providing a pair of rolls one of which has a peripheral groove or recess and the other of which enters partly into said groove to form a substantially rectangular space to which what may be termed a rope of plastic candy, having a size approximately equal to the transverse area of the space between the rolls, is supplied so as to be shaped by said space, the rotary motion of the rolls serving to feed the candy and effect sufficient pressure on all sides thereof to convert it to the desired shape. If other material is included, such as nuts, said material is not cut but is pressed into the sides as well as the top and bottom of the strip, leaving all surfaces smooth.

When layer candy is to be produced as, for instance, two layers of molasses taffy with a filling layer of ground peanuts or peanut butter between them, the layers are liable to separate if the pieces are formed by cutting them from a sheet. Therefore another object of my invention is to produce such candy with the filling material completely enclosed at the edges of the strips. This object is attained by applying a layer of the filling on top of a layer of the candy, folding the latter onto the filling layer, manually converting it to somewhat rope-form, and then supplying it to the space between the two rolls as above described, the said rolls then shaping the strip without cutting into or exposing the filling.

Of the accompanying drawings.

Similar reference characters indicate similar parts in all of the views.

Figure 1:
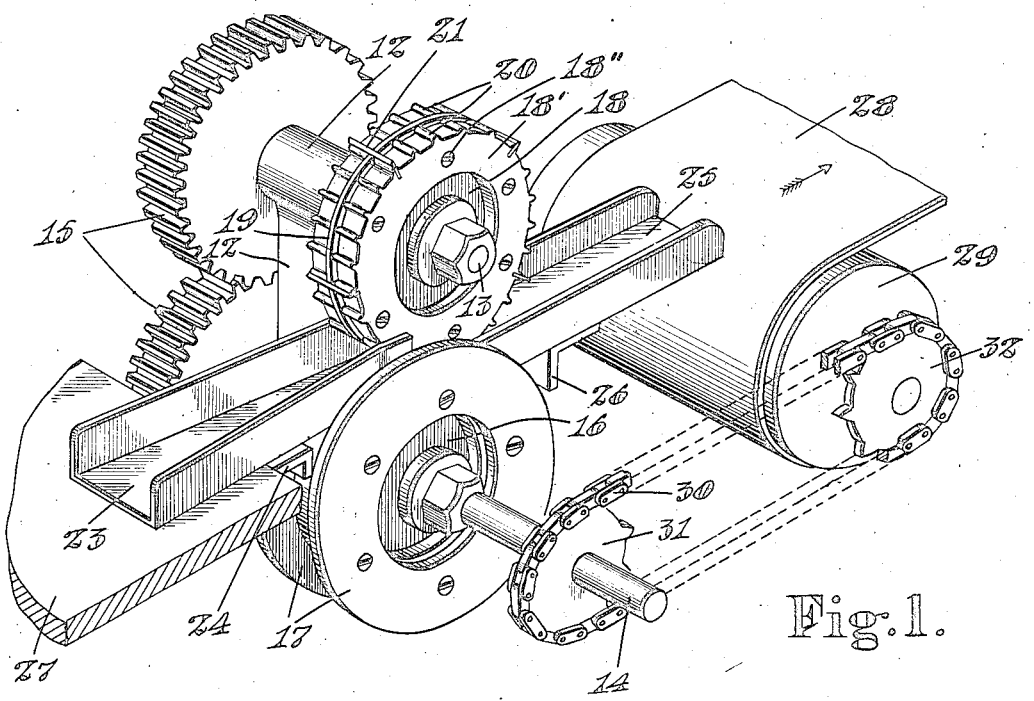
Figure 1 is a perspective view of one of my improved machines which may be employed for carrying out the method hereinafter described and claimed.
Figure 2:
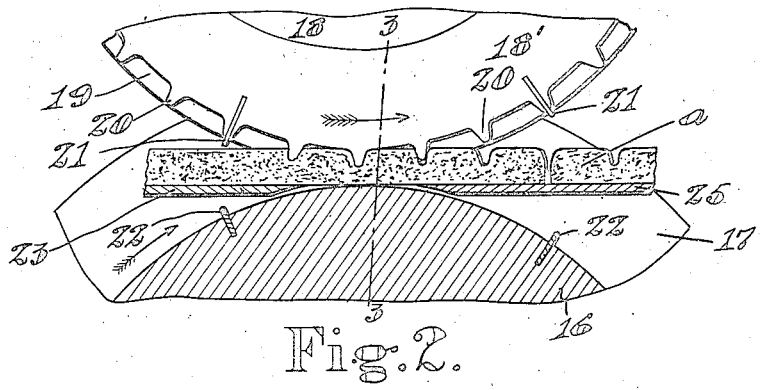
Figure 2 is a sectional side elevation.
Figure 3:
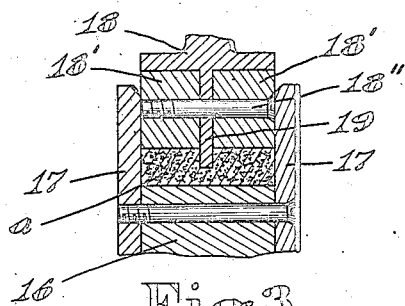
Figure 3 is a section on line 3—3 of Figure 2, illustrating the action of the rolls on a supply of plastic material passing between them.

Referring first to Figures 1, 2 and 3, a suitable frame, a portion of which is indicated at 12, has bearings for upper and lower shafts 13, 14, having intermeshing gears 15 and driven by any suitable motor and connections not necessary to illustrate.

The lower shaft 14 carries a roll 16 having flanges 17 so that said roll as a whole has, peripherally, a recess or groove forming three sides of a rectangular space. The upper roll shaft 13 carries a roll 18 the margin of which is transversely proportioned to closely fit between the flanges 17 of the lower roll, the periphery of said upper roll 18 presenting the fourth side of the rectangular space or throat for the passage of plastic candy as indicated at $a$ in Figures 2 and 3.

In the machine illustrated by Figures 1, 2 and 3, the roll 18 has a rib 19 at the midwidth of its periphery and has transverse projections forming indenting ribs 20 at close intervals. At longer intervals the transverse projections consist of blades 21 adapted to coact with transverse blades 22 on the periphery of the lower roll 16 and so act upon the strip $a$ as to either completely sever the strip at regular spaced intervals or so nearly sever it as to enable it to be readily converted into sticks of predetermined marketable lengths.

A trough 23 supported by a bracket 24 leads from a suitable table 27 to the space between the rolls, and a trough 25 supported by a bracket 26 leads from said space to a belt 28 running over a roll 29 driven by a chain 30 mounted on sprockets 31, 32, carried, respectively, by the shaft 14 and the shaft of the belt roll 29. The sprockets 31, 32, are equal in diameter, and the roll 29 is of such diameter that the belt 28 travels at substantially the same speed as the peripheral speed of the shaping rolls 16, 17. Therefore, when the machine is in operation, as hereinafter described, a strip $a$ shaped by the rolls 16, 17, and delivered along the trough 25 to the belt 28, will be carried along in a straight unbroken path for cooling and to wrapping mechanism when the latter is employed.

In order that the machine may be adapted to effect the shaping of strips having different surface configurations, different rolls 18 may be substituted one for another on the shaft 13. Or peripheral portions of a roll 18 may be changed. As illustrated by Figure 3, the rib 19 which may be integral with or rigidly secured to the body of the roll, has ring-shaped members 18' secured against its opposite sides by screws 18''. When so constructed, the ring-shaped portion 18' of the roll 18 may be removed and others substituted therefor, such others having any desired peripheral configurations instead of the ribs 20 and blades 21.

Figure 4:
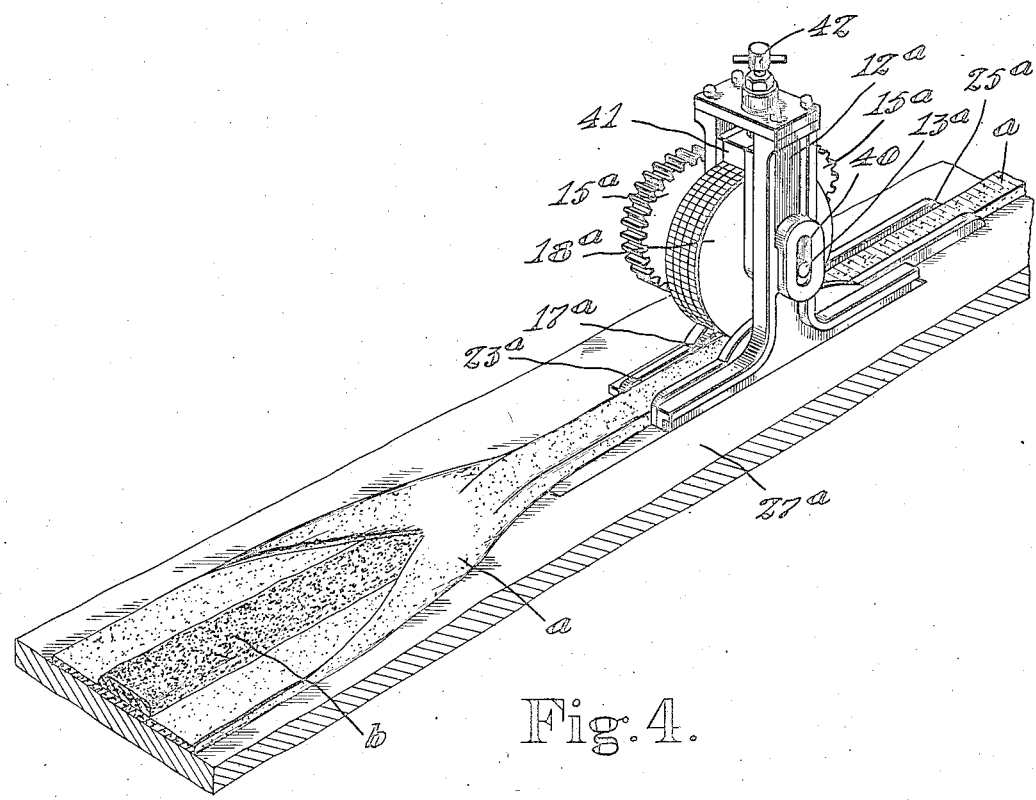
Figure 4 is a perspective view similar to Figure 1 but illustrating a somewhat different structure of mechanism, said figure also illustrating the method hereinafter described and claimed.

In Figure 4 I illustrate a machine the same in principle as the machine shown by Figure 1, but in which the upper roll 18$^a$ has simply a series of grooves at right angles to each other in its periphery to serve the purpose of feeding a strip better than could be effected by a smooth-surfaced roll, and to also impress a somewhat attractive or distinctive design in the surface of the strip. The portions of this machine which correspond to those of the machine illustrated by Figures 1, 2 and 3, have the same reference numerals with the addition of the exponent "a."

As illustrated by Figure 4, the upper roll may be adjusted vertically when it is desired to shape strips of different thicknesses. To this end the shaft 13$^a$ of the upper roll extends into vertical slots such as indicated at 40 in the frame. In this form of machine the drive of the upper roll is effected by a well-known type of train gearing portions of which are indicated at 15$^a$, which gearing is not operatively affected by changes in the elevation of the roll 18$^a$. In this machine the shaft 13$^a$ is mounted in a yoke 41 which is adjustable by means of a screw 42 in a threaded hole in a cap plate of the frame.

It is to be understood that the upper roll of the machine shown by Figure 1 may be arranged to be adjusted vertically in a manner similar to that of the machine shown by Figure 4, or that the upper roll shown in Figure 1 may be substituted for that shown in Figure 4.

In operation, an attendant manipulates a mass of plastic candy on the table 27 or 27$^a$ in such manner as to gradually and continuously draw out therefrom a somewhat rope-shaped supply, and feed it through the trough 23 or 23$^a$ to the space between the shaping and compressing wheels or rolls. If there are nuts projecting from the candy they will be pressed back into the plastic candy by the peripheries of the two rolls and the side flanges of the lower roll, which flanges overlap the sides of the upper roll. At the same time a predetermined pattern is impressed in the upper surface of the strip $a$ by the configuration of the upper roll. Both rolls are preferably of brass to which candy does not stick.

Figure 5:
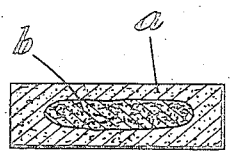
Figure 5 is a cross-sectional view of the candy after completion of the folding and rolling.

As hereinbefore mentioned, a layer of ground peanuts or peanut butter, or other desirable material $b$, may be spread on a flat strip of plastic candy *a* on the table, said strip then folded or rolled onto the upper layer, and the folded or rolled strip then fed to the space between the shaping rolls, as illustrated by Figure 4, and thereby converted to a uniform shaped strip having a completely enclosed filling as illustrated by Figure 5. The rolls feed the shaped strip along the delivery trough to the belt 28 which is long and on which it is cooled before being cut into short lengths or blocks for wrapping or other disposition.

It is to be understood, of course, that the same method can be practiced while employing the mechanism illustrated by Figures 1, 2 and 3.

When the rolls are provided with blades 21, 22, such as indicated in Figures 1 and 2, the shaped strip *a*, after cooling on the belt 28, is usually easily broken into sticks of uniform lengths and substantially rectangular in cross section, capable of being wrapped up in close fitting paper.

Having now described my invention, I claim:—

The method of preparing candy having a filling in shape for wrapping, consisting in supplying a layer of the candy with a superposed layer of the filling, folding the candy layer upon the filling layer, and then subjecting it to rolling compression exerted against four sides whereby a strip of substantially uniform cross-section is formed.

In testimony whereof I have affixed my signature.

ALTON L. MILLER.